Dec. 27, 1938.     H. J. WOODALL     2,141,501
TRIM PANEL AND FASTENER THEREFOR
Original Filed May 31, 1935
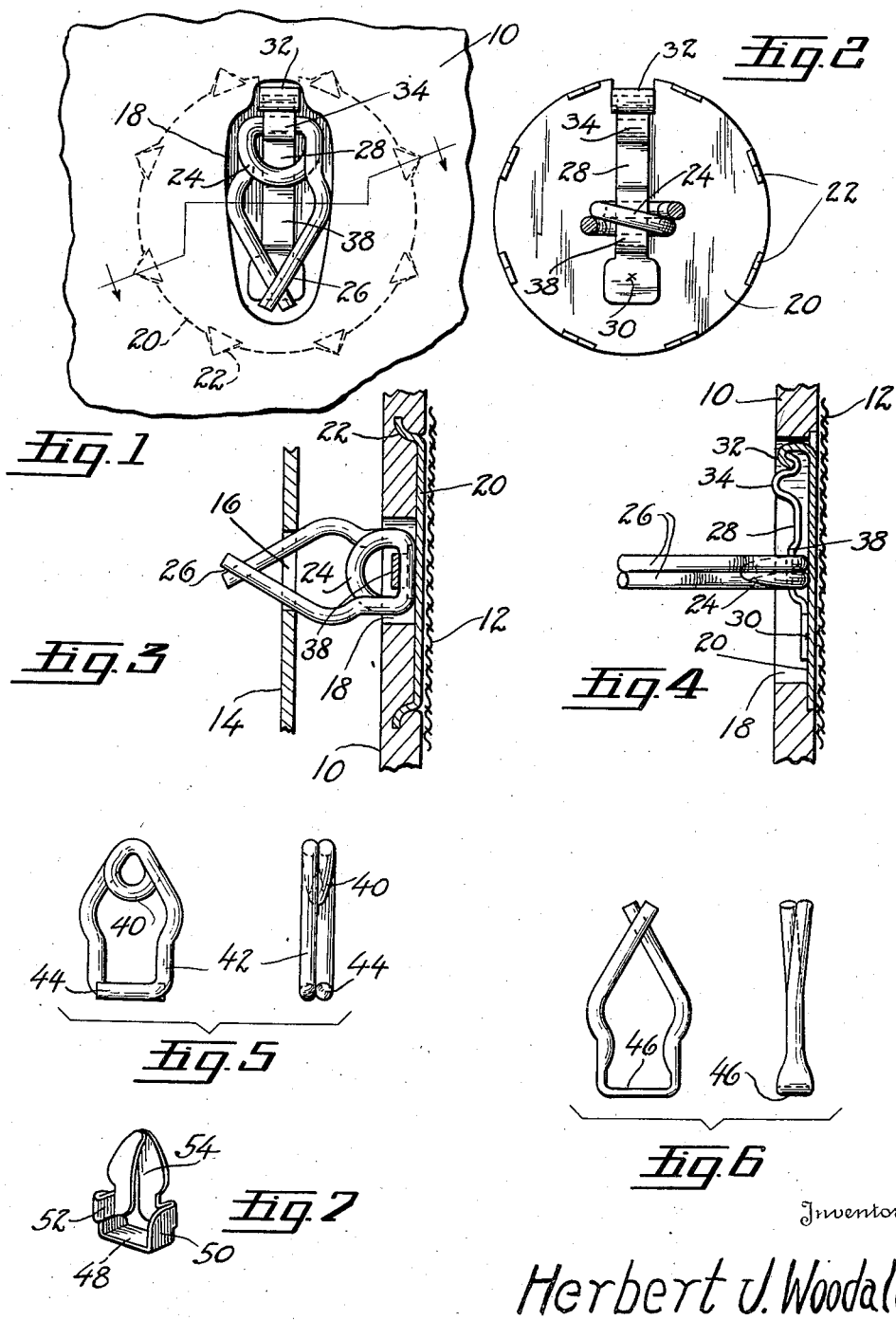
Inventor
Herbert J. Woodall
By Parker & Burton
Attorney Patented Dec. 27, 1938

2,141,501

UNITED STATES PATENT OFFICE 2,141,501

TRIM PANEL AND FASTENER THEREFOR

Herbert J. Woodall, Detroit, Mich., assignor to Woodall Industries Incorporated, Detroit, Mich., a corporation of Michigan Original application May 31, 1935, Serial No. 24,297. Divided and this application April 29, 1938, Serial No. 205,067

6 Claims. (Cl. 24—215)

This invention relates to improvements in detachable spring fasteners particularly adapted for use in the attachment of trim panels to their supports within the interior of closed automobile bodies. This application is a division of application Serial No. 24,297, filed May 31, 1935.

An object is to provide a spring fastener structure which is adapted to be permanently secured to a trim panel and which includes a fastener holding element adapted to attach the panel to a support and which holding element is permanently secured to the panel by a retainer, and which holding element is adapted to fold flat against the panel or within the thickness thereof.

The construction is such that the fastener may be secured to the panel foundation board prior to the covering of such foundation board with the trim cloth. The structure of the fastener is such that it will not interfere with the covering of the foundation board with the trim cloth after the fastener has been attached to the foundation board. The securement of the fastener structure to the foundation board is of such a character that it will not cause a protrusion of the trim cloth at such point even though the trim cloth is placed upon the foundation board without the interposition of any wadding therebetween.

Due to the fact that the fastener folds flat against the panel or within its thickness it is possible to stack a plurality of these panels flat one upon top of the other for storage or shipment. When it is desired to attach a panel to its support the fastener may be quickly elevated to project normal to the plane of the panel so that it may be attached to its support.

Preferably the fasteners are secured to a panel foundation board which is provided with recesses adapted to receive the fastener holding elements when folded down so that these holding elements lie within the thickness of the foundation board.

An important feature is the provision of a fastener which comprises a retainer element that is adapted to be secured to the foundation of a trim panel and preferably within a recess formed therein and which retainer element carries a fastener holding element, which holding element is adapted to lie flat against the retainer element to permit handling, storage, and shipment of the panels but which holding element is adapted to be elevated to project outwardly away from the panel normal to the retainer element so as to permit the panel to be attached to a support. The support is provided with apertures adapted to receive the holding element portion of the fastener and to be releasably engaged thereby so that the panel may be detached from its support.

Other objects, advantages, and meritorious features of my invention will more fully appear from the following specification, appended claims, and accompanying drawing, wherein:

Figure 1 is an elevation of a fragment of a panel provided with my improved fastener showing the fastener in a position of non-use, Fig. 2 is a plan of the fastener structure partly in section showing the fastener holding element positioned for use, Fig. 3 is a cross section through the structure shown in Fig. 1 but showing the holding element elevated for use, Fig. 4 is a cross section through the structure of Fig. 1 but again showing the holding element elevated for use and at right angles to the view in Fig. 3, Fig. 5 illustrates a modified form of holding element as compared with that shown in Figs. 2 and 3, Fig. 6 illustrates a modified form of holding element, and Fig. 7 illustrates a second modified form of holding element.

In attaching trim panels to the supports within the interior of automobile bodies it is desired to have the panel so secured in place that it is capable of detachment. It is also desirable under many circumstances to have the panel so equipped with fasteners that the panel may be completely trimmed with the upholstery cloth and a plurality of panels stacked flat for storage and shipment and without the necessity of loosening the upholstery cloth for the attachment of fasteners to the panel foundation when it is desired to attach the panels to their supports. One method of accomplishing this aim is to provide panels so constructed that the fasteners will be attached thereto from the rear after the upholstery cloth has been secured to the front face of the foundation. The second method is to provide the panel foundation with fasteners secured thereto before the upholstery cloth is attached but with the fasteners that heretofore have been used this second method has presented the objectionable feature of fasteners projecting away from the rear face of the panel and interfering with stacking the panels.

In the construction here illustrated the fasteners may be permanently attached to the panel foundations before the upholstery cloth is attached thereto. The holding elements which normally project away from the panel foundations may be folded down to lie flat thereagainst and within the thickness thereof. They occupy this position when not in use. The panels may therefore be piled flat without interference by the fasteners. When the panels are to be attached to the framework the holding elements of the fasteners may be elevated to their position of use. The construction is such that the fastener secures the panels snugly to the panel support but is capable of release therefrom to permit replacement of the panels.

In the construction illustrated the panel foundation board is indicated as 10. Upholstery cloth 12 extends over the front face thereof. The fasteners are arranged in line along the margin of the panel as is common practice. A portion of the support is indicated as 14. This support is commonly formed of sheet metal as is the practice in automobile body work and it is provided with apertures 16 adapted to receive the fastener holding elements. The panel foundation may be formed of composition fiber board of a suitable character and possess sufficient strength and rigidity and other necessary characteristics to serve its purpose. The upholstery trim cloth may be of any character desired. It may be spread flat over the front face of the panel board as shown or wadding may be used thereunderneath if it is desired to have a padded panel.

Preferably the fasteners are secured to the panel foundation with the recess formed therein so that when the holding elements are folded flat they will lie within the thickness of the panel foundation. In the figures of the drawing one of these recesses or apertures as they are here shown is indicated as 18. This aperture 18 is provided with a countersunk area on the front face of the panel as illustrated in Figs. 3 and 4.

The fastener structure comprises a disc shaped plate or base portion 20 provided with a plurality of marginal tangs 22. This base is here shown secured to the front face of the panel foundation seated within the countersunk portion encircling the aperture 18 and with the tangs projecting into the foundation board to secure the base firmly in place. It will be seen that the base lies within the thickness of the panel foundation so that the upholstery cloth 12 may extend thereover and lie perfectly flat. The base therefore forms a support for the trim cloth bridging the aperture.

This base carries a spring clip or retainer strip portion 28 which may be spot welded to the base at one end as at 30 as shown in Figs. 1, 2 and 4 of the drawing. The opposite end of this strip is provided with a hook or the like which is received underneath the finger portion 32 that is turned up from the base as shown in Figs. 1, 2 and 4. This retainer strip secures the holding element shown in Figs. 5, 6 and 7 of the fastener to the base. The form of holding element shown in the first four figures of the drawing is fabricated of spring wire bent to provide a loop portion 24 arranged within the plane of two bowed legs 26 which legs are continuations of the loop. These legs converge at their outer ends opposite the loop and have a point of maximum divergence intermediate their outer ends and the loop and are adapted to be received within the aperture 16 within the supporting framework 14 as shown in Fig. 3. Fig. 3 illustrates the initial point of entrance of these legs of the holding element into the aperture 16 and it will be apparent that continued movement of the panel toward the support would project the legs entirely through the aperture 16 and that the panel would be held tightly against the support by the spring tension of the legs against the edge of aperture 16. The head of the fastener might be termed a flat head as the two loop portions lie adjacent to each other as shown in Fig. 4 forming a flat head portion on the holding element.

Fig. 5 illustrates a slightly modified form of holding element wherein the fastener is again formed of a single piece of wire but wherein the wire is bent so as to provide a loop 40 at the outer end of the spring legs and these legs are turned inwardly to provide portions 44 which form the flat head of the fastener.

Fig. 6 illustrates a slightly different form of holding element wherein the base is flattened as at 46 and the bowed legs rise from the base as shown.

Fig. 7 illustrates another slightly modified form of holding element which is formed of sheet metal or ribbon stock. It has a flat base 48, the ends of the base are bent upwardly forming wing portions 50 and the legs 54 are twisted to lie edgewise with respect to each other and are bowed as illustrated. This twisting of the legs may be accomplished by bending them back as at 52 over the portions 50.

Each of these modifications illustrates a holding element structure which is adaptable for use in conjunction with the base shown. The flat head of the holding element is received underneath the retainer strip 28 to be held thereby snugly against the base 20 of the retainer element. It will be noted that the retainer strip 28 is bowed outwardly as at 34 forming a bend which has a depth greater than its width. The depth of this bend is such that the head of the holding element may be received thereunderneath edgewise as shown in Fig. 1. In other words when the holding element is folded flat against the base as shown in Fig. 1 with the plane of its width projecting normal to the base it is receivable within the bend 34 and snugly held thereby against the base. This bend is sufficiently deep that the holding element would not be held snugly against the base 20 if the head of the holding element were disposed flat against the base. The retainer strip is provided with a second bend 38 which has a width greater than its depth. This second bend is disposed substantially intermediate the length of the retainer strip while the first bend 34 is disposed adjacent one end thereof. The depth of this bend 38 or its spacing from the base is such that the flat head of the holding element when disposed flat thereunderneath is held snugly against the base.

In other words, the holding element when positioned as shown in Fig. 4 with the flat head within the bend 38 is held snugly against the base with the legs projecting normal thereto. In this position it is disposed for use. Within this bend it cannot be folded flat. The bend is not sufficiently deep to permit such folding. When it is desired to fold the holding element flat to a position of non-use it is moved underneath the spring strip 28 to a position within the bend 34 at which point it may be folded flat and it will be seen that due to the fact that this bend 34 is positioned at one end of the retainer strip the holding element may be folded flat within the recess.

The retainer strip extends transversely across the recess. The positioning of this bend 34 at one end of the retainer strip makes it possible to fold the whole element flat within a recess of minimum dimension. Though the holding element could be moved to the position of Figs. 3 and 4 opposite the bend 34 it would not be retained in the upright position by such bend because the retainer strip is bent so as to receive it with the head of the holding element edgewise and it would not hold the head of the holding element snugly against the base if such head were flat. The bend 34 is relatively narrow so that its sides grip the head of the holding element when disposed edgewise and retain the holding element in the folded position until sufficient pressure is exerted to bring it to the upright position. When the holding element is disposed as shown in Figs. 3 and 4 it is held by the bend 38 so snugly against the base that it will maintain this upright position. The depth of this bend 38 is insufficient to permit the holding element to be folded flat therein.

What I claim:

1. A spring fastener for detachably securing a trim panel to a support comprising a holding element having a flat head and bowed spring legs carried by and disposed normal to the plane of the head and receivable through an aperture formed in the support and engageable with the margin of such aperture, and a retainer element secured to the panel and provided with a retainer strip extending over the flat head of the holding element urging said head toward the panel and securing said holding element thereto, said retainer strip bowed outwardly at one point in its length into a bend having a depth greater than its width and adapted to snugly receive the head of the holding element when disposed edgewise thereunderneath and bowed outwardly at another point spaced linearly of its length from said first bend into a second bend having a width greater than its depth and adapted to snugly receive the flat head of the holding element when disposed flat thereunderneath.

2. A spring fastener for detachably securing a trim panel to a support comprising a holding element having a flat head and bowed spring legs carried by and disposed normal to the plane of the head and receivable through an aperture formed in the support and engageable with the margin of such aperture, and a retainer element secured within a recess formed in the rear face of the panel and provided with a retainer strip extending across the bottom of said recess over the flat head of the holding element urging said head toward the bottom of the recess, said retainer strip bowed outwardly adjacent to one end in a bend having a depth greater than its width and adapted to snugly receive the head of the holding element when disposed edgewise thereunderneath and bowed outwardly intermediate its ends into a second bend having a width greater than its depth and adapted to snugly receive the head of the holding element when disposed flat thereunderneath.

3. A spring fastener for detachably securing a trim panel to a support comprising a holding element having a flat head and bowed spring legs carried by and disposed normal to the plane of the head and receivable through an aperture formed in the support and engageable with the margin of such aperture, and a retainer element secured to the panel and provided with a retainer strip extending over the flat head of the holding element urging said head toward the panel and securing said holding element thereto, said retainer strip provided with two spaced apart bends in each of which the strip is bowed outwardly away from the panel, one bend so shaped as to urge the head of the holding element toward the panel when such holding element is laid flat parallel to the plane of the panel, the other bend so shaped as to urge the head of the holding element toward the panel when the holding element projects outwardly normal to the plane of the panel.

4. A spring fastener for detachably securing a trim panel to a support comprising a holding element having a flat head and bowed spring legs carried by and disposed normal to the plane of the head and receivable through an aperture formed in the support and engageable with the margin of such aperture, and a retainer element secured to the panel and provided with a base portion and a retainer strip portion overlying the base portion and secured thereto, said flat head of the holding element being spring gripped between the retainer strip portion and the base portion, said retainer strip portion being bowed outwardly away from the base portion at two spaced apart points forming bends in each of which the head of the fastener is receivable and snugly held thereby against said base portion, one bend having a depth greater than its width and the other bend having a width greater than its depth.

5. A spring fastener for detachably securing a trim panel to a support comprising a holding element having a flat head and bowed spring legs carried thereby and disposed normal thereto and receivable through an opening formed in the support and engageable with the margin of said opening and a retainer element provided with a flat base portion secured to the front face of the panel bridging an aperture through the panel and provided with a retainer spring strip portion secured to the base portion and disposed within said aperture extending transversely thereof, said flat head of the holding element disposed between said strip portion and base portion of the retainer element and held snugly against the base by said strip but frictionally resistingly adjustable over said base underneath said spring strip when the head of the holding element lies flat against the base, said strip portion and base portion being spaced apart at one point sufficiently to snugly receive the flat head of the holding element disposed edgewise thereunderneath with the holding element laid flat against the base, said spring strip portion and base portion being spaced at another point sufficiently to snugly receive the flat head of the holding element flat thereunderneath with the legs of the holding element projecting outwardly normal to the base.

6. A spring fastener for detachably securing a trim panel to a support comprising a holding element having a flat head and bowed spring legs carried thereby and disposed normal thereto and receivable through an aperture formed in the support and engageable with the margin of said aperture and a retainer element provided with a base portion secured to the panel within a recess formed in the panel and provided with a spring retainer strip portion secured to the base portion and disposed within said recess, said flat head of the holding element disposed between said strip portion and base portion of the retainer element and held snugly against the base by the spring strip but frictionally slidable over the base underneath the spring strip when the head of the holding element lies flat against the base, such spring strip and base portion being spaced apart at one point sufficiently to snugly receive the flat head of the holding element therebetween when disposed edgewise thereunderneath with the holding element laid flat against the base and being spaced apart at another point sufficiently to snugly receive the flat head of the holding element therebetween when disposed flat against the base and with the legs of the holding element projecting outwardly therefrom normal thereto.

HERBERT J. WOODALL.